United States Patent
Amundson et al.

[19]

[11] Patent Number: 5,906,770
[45] Date of Patent: *May 25, 1999

[54] POLYMER-DISPERSED LIQUID CRYSTAL COMPOSITION

[75] Inventors: Karl R. Amundson, Morristown, N.J.; Mohan Srinivasarao, Raleigh, N.C.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/606,931

[22] Filed: Feb. 26, 1996

[51] Int. Cl.⁶ .............................. C09K 19/52; F21V 9/00
[52] U.S. Cl. ...................................... 252/299.01; 252/582
[58] Field of Search ................................. 252/299.01, 582

[56] References Cited

U.S. PATENT DOCUMENTS

| | | | |
|---|---|---|---|
| 4,435,047 | 3/1984 | Fergason | 350/334 |
| 4,818,070 | 4/1989 | Gunjima et al. | 350/334 |
| 4,891,152 | 1/1990 | Miller et al. | 252/299.01 |
| 4,938,568 | 7/1990 | Margerum et al. | 350/334 |
| 5,011,624 | 4/1991 | Yamagishi et al. | 252/299.5 |
| 5,073,294 | 12/1991 | Shannon et al. | 252/299.01 |
| 5,496,497 | 3/1996 | Takiguchi et al. | 252/299.01 |
| 5,571,448 | 11/1996 | Wartenberg et al. | 252/299.5 |
| 5,578,243 | 11/1996 | Masaki et al. | 252/299.01 |
| 5,585,947 | 12/1996 | Havens et al. | 349/92 |

FOREIGN PATENT DOCUMENTS

| | | | |
|---|---|---|---|
| 0 564 869 A1 | 3/1993 | European Pat. Off. | C09K 19/54 |
| WO 92/19695 | 11/1992 | WIPO | C09K 19/56 |
| 93/00989 | 11/1993 | WIPO | C09K 19/54 |
| WO 93/23496 | 11/1993 | WIPO | C09K 19/52 |
| 93/01378 | 12/1993 | WIPO | C09K 19/54 |
| WO 93/24589 | 12/1993 | WIPO | C09K 19/54 |
| WO 95/29966 | 11/1995 | WIPO | C09K 19/54 |
| WO 95/29967 | 11/1995 | WIPO | C09K 19/54 |
| WO 96/19547 | 6/1996 | WIPO | C09K 19/54 |

*Primary Examiner*—C. H. Kelly
*Attorney, Agent, or Firm*—Richard J. Botos

[57] ABSTRACT

A novel PDLC film composition that contains a mixture of acrylate monomers that provide certain advantages when combined with a liquid crystal. The mixture of acrylate monomers contains one monofunctional monomer that gives rise to a homeotropic anchoring condition, and one monofunctional monomer that gives rise to homogeneous anchoring condition in the PDLC film made from the composition of the present invention at a selected temperature. The monomer mixture also contains a polyfunctional acrylate monomer. PDLC films made from these compositions have advantages over films made from compositions that have only one monofunctional acrylate monomer. Also, by using the process of the present invention, one can prepare a PDLC film that exhibits a low switching voltage in a desired temperature range.

10 Claims, 3 Drawing Sheets

POLYMER-DISPERSED LIQUID CRYSTAL COMPOSITION

BACKGROUND OF THE INVENTION

1. Technical Field

This invention is directed to a polymer-dispersed liquid crystal composition.

2. Art Background

Polymer-dispersed liquid crystals (PDLCs herein) are compositions in which liquid crystal drops are dispersed in a polymer matrix. Liquid crystals are materials which are liquids in the conventional sense of being in a condensed state that is flowable. Liquid crystals are anisotropic molecules which exhibit long-range orientational order. The particular orientation affects the transmission of light through the liquid crystals.

PDLC films can be used in applications such as flat panel displays because the light-scattering properties of PDLC films can be manipulated. One way to manipulate the light-scattering properties of PDLC films is to apply an electric field to the film. The light-scattering power of the film is different (typically smaller) when the liquid crystal in the drops are aligned by the electric field than when the liquid crystal is not so aligned (i.e. in the absence of the electrical field). Typically, a PDLC film is designed to scatter light in the absence of an electric field and be transparent to light when a voltage is applied across the film. In this case, it is desirable to choose the refractive index of the polymer matrix to be close to the ordinary refractive index of the liquid crystal when the voltage is applied, so that the film is transparent when the voltage is applied thereto. The degree of contrast between the transparent and scattering states of the PDLC film is one parameter that determines the quality of the image, i.e., the higher the contrast, the better the image quality.

There are many ways to make PDLC films. In one scheme, the films are made by combining the liquid crystal composition with a radiation-curable monomer. When the liquid crystal/monomer mixture is exposed to radiation, the monomer polymerizes, thereby forming a polymer matrix. As the monomer polymerizes, the liquid crystal becomes less soluble in the mixture. Due to decreased solubility in the polymer matrix, liquid crystal droplets form during polymerization. The solidification of the matrix prevents the liquid crystal droplets from coalescing, thereby ensuring a stable droplet dispersion throughout the matrix. Typically, the polymer matrix for PDLC films is cured using ultraviolet (UV) radiation. The electro-optical properties of the resulting film depend upon the size distribution of the liquid crystal droplets, their shape, and the interactions between the matrix and the liquid crystal at the droplet surface. Since these parameters are determined, in large part, by the matrix in which the liquid crystal droplets are dispersed, it follows that selection of an appropriate matrix polymer is critical to the properties of the resulting PDLC film.

Monomers that, when polymerized, provide a suitable matrix for liquid crystals for use as PDLC films, are known. Examples of such monomers include acrylates, methacrylates, thiols, and alkyl ethers. For example, PDLC films are formed by combining an alkyl acrylate such as 2-ethyl hexyl acrylate or n-hexyl acrylate with a photoinitiator, a polyfunctional acrylate such as, for example, trimethylol propane triacrylate, and a commercially available liquid crystal mixture, e.g. a liquid crystal mixture such as the one designated TL205 and obtained from E. M. Industries of Hawthorne, N.Y. The film is formed by placing the mixture between glass plates with an electrically conductive coating (e.g. a coating of indium tin oxide) thereon, and exposing the mixture to UV radiation.

One of the difficulties with PDLC films is the high voltage required to switch them from the transparent to the opaque state. For convenience, switching from transparent to opaque is hereinafter referred to as switching from "off" to "on", or vice-versa. Current PDLC films have a thickness of about 10 $\mu$m. Although thicker films are advantageous from the standpoint of contrast. between the "on" and "off" states of the film, thicker films also require a higher switching voltage than thinner films. Similarly, it is known that the contrast between the "on" and "off" states of the display is related to droplet size of the liquid crystal in the matrix. However, changing the drop size to improve contrast usually results in a higher switching voltage. Therefore, a PDLC film that provides a greater contrast between "on" and "off" states without a concomitant increase in switching voltage is sought.

SUMMARY OF THE INVENTION

The present invention is directed to a PDLC composition that contains a mixture of polymerizable acrylate monomers that provide certain advantages. The PDLC composition contains a liquid crystal in combination with the mixture of polymerizable acrylate monomers. Examples of suitable liquid crystals are described in International Patent Application No. PCT/EP93/00989 to Coates et al. which is hereby incorporated by reference. The liquid crystal content is about 50 weight percent to 90 weight percent of the PDLC composition, preferably about 75 weight percent to about 90 weight percent. It is advantageous if the mixture of polymerizable acrylate monomers is about 10 percent to about 50 weight percent of the total PDLC composition.

The polymerizable monomer mixture is, in turn, a mixture of at least two monofunctional acrylate monomers and at least one polyfunctional acrylate monomer. In the context of the present invention, monofunctional means that the monomer contains only one ethylenically unsaturated bond and that bond is contained in the acrylate moiety of the monomer. Polyfunctional means that the monomer contains more than one ethylenically unsaturated bond. It is advantageous if the polymerizable monomer mixture is about 70 weight percent to about 95 weight percent of the monofunctional acrylate mixture, about 5 weight percent to about 25 weight percent of the polyfunctional acrylate, and about 0.01 weight percent to about 5 weight percent of a photoinitiator.

The monofunctional acrylate monomers are, in turn, a mixture of acrylate monomers that provide films made of the PDLC composition of the present invention with advantageous properties such as low switching voltage. The mixture of monofunctional acrylate monomers contains at least two monomers. The two monomers have a combined effect on the surface interactions between the liquid crystal and the polymer matrix.

These surface interactions are important because the surface energy between the liquid crystal droplet and the matrix is a function of what is referred to as the liquid crystal "director" with respect to the matrix surface. Certain director orientations are associated with lower surface energies than other director orientations. This relationship of surface energy and orientation is referred to as "surface anchoring." There are many types of surface anchoring. Two types of anchoring are of importance in the present invention: homeotropic anchoring and homogenous anchoring. For purposes of the present invention, homeotropic anchoring is defined as an anchoring condition where the droplet director prefers to align approximately normal to the matrix surface, i.e., the director orientation forms an angle greater than about 80 degrees with the plane of the interface. Homogeneous anchoring is defined as an anchoring condition where the droplet director prefers to align approximately with the plane of the matrix surface, i.e., the director orientation forms an angle of less than 15 degrees with the plane of the matrix surface. These surface interactions are temperature dependent as well as composition dependent.

As previously noted, the PDLC composition of the present invention is formed by combining the liquid crystal with an acrylate mixture that contains at least two monofunctional acrylates. At least one of the monofunctional acrylates gives rise to a homeotropic anchoring condition at the desired operating temperature of the film formed from the PDLC composition. At least one of the monofunctional acrylates gives rise to a homogeneous anchoring condition at the desired operating temperature of the film formed from the PDLC composition. The anchoring condition resulting from use of a particular monofunctional acrylate at a particular operating temperature is determined empirically. This determination can be made in a variety of ways, such as, for example, by observing the effect of a change in temperature on the "fall time" of a PDLC film formed from a PDLC composition in which the monofunctional acrylate under investigation is the sole monofunctional acrylate in the composition. The fall time is a measure of the time it takes for the PDLC film to relax, i.e. to return to its "off" state scattering characteristics, after an electric field being applied to the film is turned off. A sharp peak in the plot of the fall time as a function of temperature indicates a transition between homeotropic and homogeneous anchoring. The temperature at which the film undergoes this transition is referred to as the transition temperature. Typically, a PDLC film undergoes a transition from homeotropic anchoring to homogenous anchoring at some temperature. Also, a film typically exhibits homeotropic anchoring below its transition temperature and homogeneous anchoring above its transition temperature. Once the transition temperature of a PDLC composition containing a single monofunctional acrylate is determined, that information is then used to select the mixture of monofunctional acrylates for the composition of the present invention.

For example, if the operating temperature of a PDLC film is determined to be 25° C. and an anchoring transition is desired at that temperature, then the mixture of monofunctional acrylates is prepared by selecting a first monofunctional acrylate that gives rise to a transition below 25° C. (which means that a PDLC film made from a PDLC composition in which the first monofunctional acrylate was the sole monofunctional acrylate component of the PDLC composition and that film exhibited a transition temperature below 25° C.) and a second monofunctional acrylate that gives rise to a transition temperature above 25° C. By way of specific example, a PDLC film made from a composition that is 80 percent by weight liquid crystal combined with 20 percent by weight of a polymerizable acrylate mixture. The polymerizable acrylate mixture contains lauryl acrylate (85 weight percent of the mixture), trimethylol propane triacrylate (13.5 weight percent of the mixture) and a photoinitiator, Darocur 1173, (1.5 weight percent of the mixture), which is obtained from Ciba in Hawthorne, N.Y. The anchoring transition temperature of a film made from this PDLC composition is 80.5° C. The transition temperature of a film made from a composition that contains 2-ethyl hexyl acrylate instead of lauryl acrylate but was otherwise identical is 23° C. If a PDLC film with an anchoring transition temperature of 30° C. is desired, a PDLC composition of the present invention is prepared using lauryl acrylate and 2-ethyl hexyl acrylate as the monofunctional acrylate mixture. The relative amounts of each of these monofunctional acrylates in the PDLC composition is determined by empirical methods that will be readily apparent to those skilled in the art.

If the anchoring behavior resulting from use of a particular monofunctional acrylate cannot be determined in the above-described manner, an alternate method for making this determination is by observing the effect of the addition of the monofunctional acrylate on the transition temperature of film formed from a PDLC composition that contains the monofunctional acrylate monomer in question in conjunction with a second monofunctional acrylate monomer for which the anchoring transition temperature is known. If the transition temperature of the two-monofunctional monomer PDLC film is less than the known transition temperature of the single monofunctional monomer film, and the transition temperature decreases with the amount of the first monofunctional acrylate in the composition, then the first monofunctional acrylate gives rise to homogeneous anchoring at least down to temperatures below the lowest measured anchoring transition temperature of the film. If the transition temperature of the two-monofunctional monomer PDLC film is greater than the transition temperature of the single monofunctional monomer PDLC film, and the transition temperature increases with the amount of the first monofunctional acrylate in the composition, then the first monofunctional acrylate gives rise to homeotropic anchoring at least at temperatures above the highest measured anchoring transition temperature.

A variety of monofunctional acrylates are contemplated as suitable for use in the PDLC composition of the present invention. Suitable monofunctional acrylates have a variety of substituent moieties. In this regard, alkyl acrylates, cycloalkyl acrylates, aryl acrylates and alkylaryl acrylates are contemplated as suitable. Examples of suitable monofunctional acrylates include lauryl acrylate, n-decyl acrylate, n-octyl acrylate, n-hexyl acrylate, 2-octyl acrylate, 2-ethyl hexyl acrylate, ethylbenzyl acrylate, and isobornyl acrylate. These acrylates are provided by way of example. The selection of a particular monofunctional acrylate for a particular composition is accomplished using the techniques previously described As previously stated, the liquid crystal, polyfunctional acrylate, and photoinitiator components of the composition of the present invention are well-known to one skilled in the art. One example of a suitable polyfunctional acrylate is trimethylol propane triacrylate. Examples of suitable photoinitiators include the benzoin-ether initiators, benzophenone-type initiators, and thioxanthone-type initiators.

DETAILED DESCRIPTION

Figure 1:
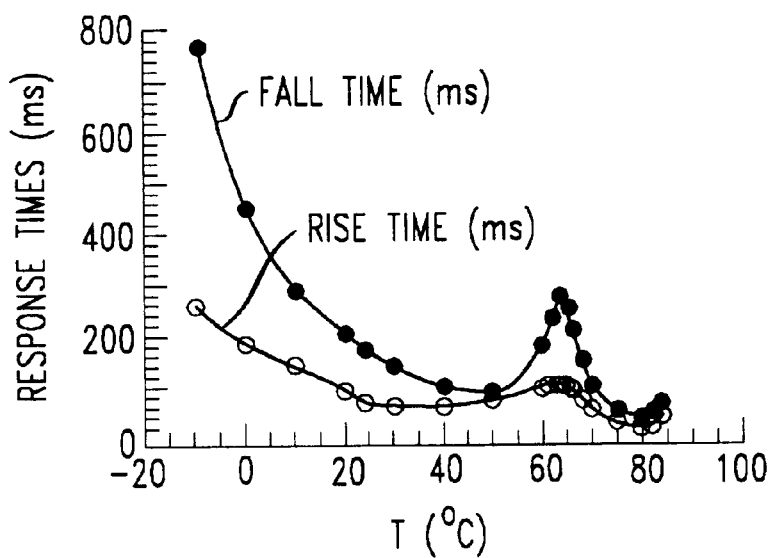
FIG. 1 is a graph of the rise and fall times (at voltage $V_{90}$) as a function of temperatures for PDLC films formed from a PDLC composition in which the monofunctional acrylate component is n-hexyl acrylate.

The PDLCs of the present invention are formed into films that have advantages over known PDLC films. The liquid crystal composition contains a standard, commercially available liquid crystal as described above in combination with a mixture of acrylate monomers that, when polymerized, forms a matrix that provides the resulting film with certain advantages.

The PDLC compositions of the present invention are about 50 to about 90 weight percent liquid crystal and about 50 weight percent to about 10 weight percent of a polymerizable monomer mixture that is a mixture of a polyfunctional acrylate, a photoinitiator, and at least two monofunctional acrylates. One of the monofunctional acrylates gives rise to a homeotropic anchoring condition at the operating temperature of the film formed from the PDLC composition. The other monofunctional acrylate gives rise to a homeotropic anchoring condition at the operating temperature of the film formed from the PDLC composition. In a further embodiment of the PDLC composition of the present invention, the liquid crystal is about 75 weight percent of the composition to about 90 weight percent of the composition and the polymerizable monomer mixture is about 10 weight percent to about 25 weight percent of the composition.

The polymerizable monomer mixture is in turn, about 70 weight percent to about 95 weight percent of a mixture of monofunctional acrylates, about 5 weight percent to about 25 weight percent of a polyfunctional acrylate and about 0.01 weight percent to about 5 weight percent of a photoinitiator.

In order to select the monofunctional acrylates for the mixture to obtain the desired effect, it must be determined whether the monofunctional acrylate gives rise to a homogeneous anchoring condition or a heterogeneous anchoring condition at the temperature at which the PDLC film will operate. Since, typically, PDLC films operate at room temperature (20° C. to 30° C.), the monofunctional acrylate mixture is selected so that one of the acrylates gives rise to a homeotropic anchoring condition within this range and the other monofunctional acrylate mixture gives rise to a homogeneous anchoring condition within this range.

Whether a particular monofunctional acrylate will give rise to a particular anchoring condition at a particular temperature can be determined by observing the behavior of a PDLC film made from a PDLC composition in which the polymerizable monomer mixture contains only one monofunctional acrylate monomer in conjunction with the polyfunctional acrylate and the photoinitiator. By observing the effects of temperature on properties of the film such as the time it takes for the film to respond to the cessation of an applied voltage and the light transmission through a film at a particular voltage, a transition temperature can be determined for many of these compositions. Exemplary methods for determining the anchoring condition provided by a particular monofunctional acrylate in a PDLC film are described below. These methods are provided by way of example only. Other equivalent methods are easily ascertained by persons skilled in the art. Examples of methods for making this determination for a particular monofunctional acrylate are provided below.

EXAMPLE 1

PDLC films were prepared by combining the following ingredients in the specified proportions:

TABLE 1

| INGREDIENT | AMOUNT |
| --- | --- |
| liquid crystal | 80 wt% |
| polymerizable acrylate mixture | 20 wt% |

The polymerizable acrylate mixture was made from the following:

TABLE 2

| INGREDIENT | AMOUNT |
| --- | --- |
| n-hexyl acrylate | 83 wt % |
| trimethyl propane triacrylate | 15.2 wt % |
| photoinitiator | 1.8 wt % |

The liquid crystal was TL205 which is obtained commercially from E.M. Industries of Hawthorne, N.Y. The initiator was Irgacure 184 which is obtained commercially from Ciba Corp. of Hawthorne, N.Y. The trimethylol propane triacrylate was commercially obtained from Aldrich Chemical Co. of Milwaukee, Wis. The acrylates specifically identified were obtained from Scientific Polymer Products of Ontario, N.Y.

The above-identified composition was formed into a film by placing the composition between glass substrates with a coating of conductive indium tin oxide thereon which is transparent to the exposing radiation and visible light. Glass microspheres were placed between the glass plates to keep a distance of about 10 microns between the plates. The film was then exposed to a 17 mW/cm$^2$ dose of UV radiation for 9 to 10 minutes using a mercury arc lamp. The resulting PDLC films were observed to have a "foam-texture" morphology, that is, the bulk of the film volume is made up of droplets with thin walls separating the droplets and the droplets themselves were in the 0.5 $\mu$m to 4 $\mu$m diameter range.

The transition temperatures for the PDLC film was determined by the following procedure. Light from a helium-neon laser was propagated normal to the plane of the PDLC film. The light intensity was first modulated at 100 kHz by a photoelastic modulator between crossed polarizers, then made circularly polarized by a quarter-wave plate. The collection half-angle for the transmitted light was set to 10° by an iris. The forward-transmitted light was then focused by a lens onto a photodetector. The photodetector signal was amplified and demodulated by a lock-in amplifier, which used the photoelastic modulator signal as a reference. In this manner, background light was eliminated from the measurement. The signal from the lock-in amplifier was recorded by a digital oscilloscope.

A gated, 1 kHz sinusoidal voltage was applied to the above-described PDLC film. The voltage was varied to determine the relationship between the applied voltage and the intensity and the film's light transmission. The applied voltage was varied in the range of 0 to 70 volts (rms). A pulse with a duration of about 500 ms was applied to determine the intensity of the film at that voltage. The duration of the pulse was increased if the intensity of the film was still visibly increasing at the end of 500 ms. At each voltage, the intensity of the signal from the film was recorded, as well as the time it took for the film to respond to commencement and cessation of the applied voltage. The time it takes for the transmitted light intensity from a PDLC film to go from 10 percent to 90 percent of the total change from the "off" and "on" states is referred to as the rise time. Similarly, the time it takes for the transmitted light intensity from a PDLC film to go from 10 percent to 90 percent of the total change between the "on" and "off" states is referred to as the fall time. By varying the voltage and observing the intensity of the light transmitted by the PDLC film, $V_{90}$, the voltage required to achieve 90 percent of the total increase in transmittance between the "off" and "on" states, was determined.

Figure 2:
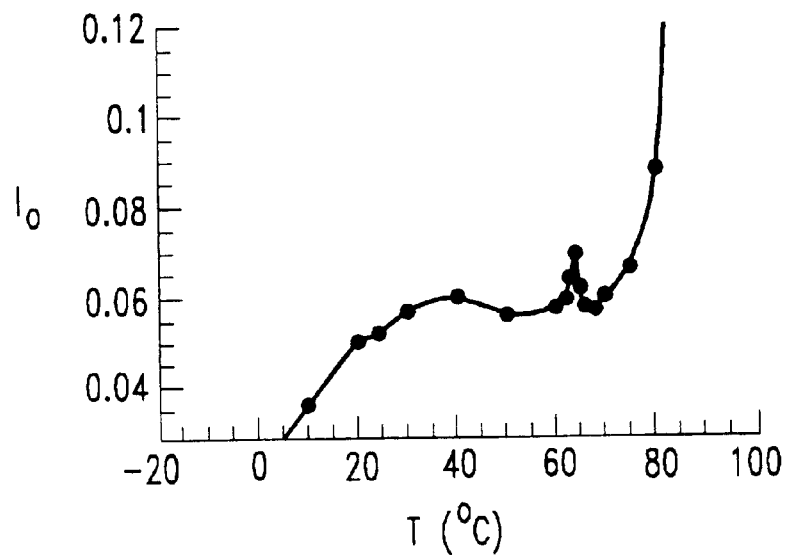
FIG. 2 is a graph of the forward light transmission as a function of temperature for a PDLC film formed from a PDLC composition in which the monofunctional acrylate compound is n-hexyl acrylate.
Figure 3:
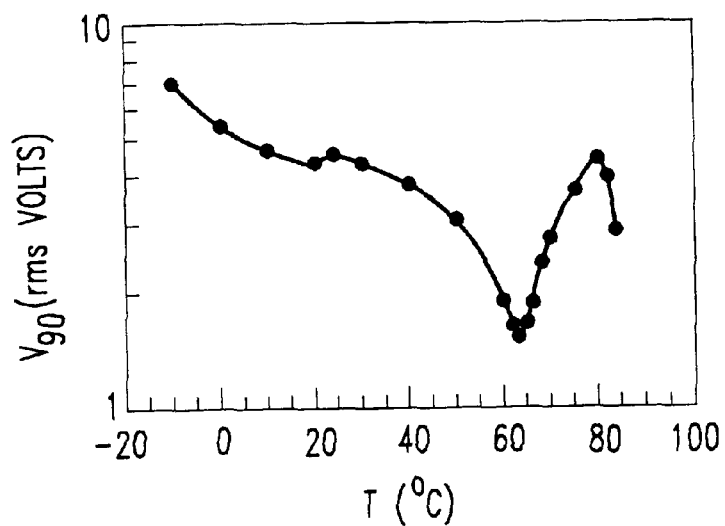
FIG. 3 is a graph of $V_{90}$ as a function of temperature for a PDLC film formed from a PDLC composition in which the monofunctional acrylate component is n-hexyl acrylate.

The PDLC film was heated and cooled in a chamber with nitrogen gas flow during electro-optical testing. The fall time, forward transmitted light intensity in the "off" state, and $V_{90}$ were measured as a function of temperature. A graph of the response time (both rise and fall times) of a film as a function of temperature is illustrated in FIG. 1. The sharp peak at 64° C. in FIG. 1 indicates that the transition temperature for the n-hexyl acrylate film is at 64° C. A sharp peak in the forward light transmission ($I_o$) at the same temperature also corresponds to the anchoring transition (FIG. 2), as does the cusp in $V_{90}$ at the same temperature (FIG. 3). The sharp peak in the fall time (FIG. 1) is viewed as indicative of the transition temperature of the PDLC film under investigation.

Polarized light microscopy was used to confirm the correspondence between the sharp peaks and cusps in the electro-optic data to the anchoring transition. The polarized light microscopy revealed many instances where the liquid crystal droplet texture was radial below 65° C., and bipolar above 65° C. These observed textures are indicative of homeotropic and homogeneous anchoring, respectively. The radial and bipolar textures are described in references such as Drzaic, P., "Liquid Crystal Dispersions," *World Scientific*, chap. 3 (1995).

EXAMPLE 2

The anchoring condition provided by various monofunctional acrylates was determined by preparing compositions in which the only monofunctional acrylate component in the polymerizable acrylate mixture was exclusively the monofunctional acrylate under evaluation. PDLC films were formed from these compositions and the transition temperature of the films was determined in the manner described in the previous example. The PDLC films were prepared as described above. Numerous compositions were prepared, each with a different monofunctional acrylate. The monofunctional acrylates used for this analysis are enumerated in Table 3 below.

TABLE 3

| Monofunctional Acrylate | Transition Temperature $T_t$ (°C.) |
|---|---|
| lauryl acrylate | 80.5 |
| n-decyl acrylate | 79.5 |
| n-octyl acrylate | 77 |
| n-hexyl acrylate | 64 |
| 2-octyl acrylate | 48 |
| 2-ethyl hexyl acrylate | 23 |
| isobornyl acrylate | not observed |

The transition temperatures for the PDLC compositions were determined as described in the previous example. Generally, the films were formed from a composition that was 80 wt % liquid crystal and 20 wt % polymerizable acrylate mixture. The polymerizable acrylate mixture was 13.5 wt % of trimethylol propane triacrylate, 1.5 wt % Darocur 1173 and 85 wt % of a monofunctional acrylate. The composition containing 2-ethyl hexyl acrylate had a liquid crystal fraction of about 81 wt %, because this composition did not exhibit a transition when the liquid crystal fraction was 80 wt % or less.

Although applicants do not wish to be held to a particular theory, applicants believe that the electro-optical signatures of the anchoring transition are related to droplet size. That is, these signatures are more difficult to detect as the droplet size decreases. When the droplet diameter is about 1 µm or less, these signatures are typically not detectable. Therefore, if the anchoring behavior of a PDLC film is to be characterized by observing electro-optic signatures, it is advantageous if the iroplet size of the liquid crystal in the film is at least about 2 µm. If the film under nvestigation has a droplet size smaller than 2 µm, the electro-optic testing described above can be done using an analogous film with a larger liquid crystal droplet size.

For example, a film with a larger liquid crystal droplet size is obtained by reducing the polymerization temperature of the matrix by about 5° C. to about 15° C. A slight increase in the liquid crystal content of the composition (i.e. an increase from an 80 wt % fraction to an 81 wt % fraction) provides an increase in the liquid droplet size in a film formed from the composition with the increased amount of liquid crystal in the composition. Since the liquid crystal fraction affects slightly the transition temperature, the transition temperature at the lower fraction should be extrapolated from the transition temperature at the higher fractions.

Another way to obtain larger droplets in a PDLC film is by reducing the rate of polymerization by reducing the concentration of photoinitiator or by reducing the intensity of the exposing radiation. However, if these methods are used, care must be taken to avoid incomplete polymerization.

One observable trend from the information in Table 3 is that the structure of the alkyl acrylate is related to its transition temperature. In this regard it is observed that the transition temperature decreases as the number of carbon atoms in the alkyl chain decreases (i.e., the transition temperature for n-hexyl acrylate is less than the anchoring transition temperature of n-decyl acrylate). Acrylates with a branched alkyl side chain and secondary alkyl acrylates typically have a lower transition temperature than their corresponding unbranched or primary homologues (e.g., the transition temperature resulting from use of 2-ethyl hexyl acrylate is less than the transition temperature resulting from use of n-octyl acrylate).

If the transition temperature of a particular monofunctional acrylate cannot be determined in the above-described manner, an alternate method for characterizing its effect on surface anchoring is by observing the effect of the addition of the monofunctional acrylate on the transition temperature of a film formed from a PDLC composition that contains the monofunctional acrylate monomer in question in conjunction with a second monofunctional acrylate monomer for which the anchoring transition temperature is known. This observation is also useful to determine the surface anchoring characteristics provided by a monofunctional acrylate where an anchoring transition temperature is observed but it is not known whether homeotropic anchoring (or homogeneous anchoring) occurs above or below the transition temperature. If the transition temperature of the films decrease with the addition of increased amounts of the first monofunctional acrylate in the PDLC composition then the first monofunctional acrylate gives rise to homogeneous anchoring at least down to the lowest measured anchoring temperature. If the transition temperature of the films increase with the addition of increased amounts of the first monofunctional acrylate in the PDLC, then the first monofunctional acrylate gives rise to homeotropic anchoring, at least up to the highest measured anchoring transition temperature. This technique is illustrated in the following example.

EXAMPLE 3

As noted in example 2, a transition temperature was not observed for isobornyl acrylate using the techniques described in the above example. A series of PDLC compositions were prepared in which the monofunctional acrylate component was a mixture of isobornyl acrylate and 2-ethyl hexyl acrylate. The amounts of the various components (e.g., the liquid crystal, polyfunctional acrylate, and photoinitiator) were the same as the amounts set forth in the previous example. Three compositions were prepared. The relative mass fractions of the 2-ethyl hexyl acrylate and isobornyl acrylate were different in each composition. The mass fractions were 0.5:0.5, 0.75:0.25, and 1:0 2-ethyl hexyl acrylate to isobornyl acrylate. The compositions were formed into films and the transition temperatures of the films were determined as described in the previous example. The transition temperature of the film was observed to increase as the mass fraction of the isobornyl acrylate in the composition decreased.

Since a PDLC film made from a composition in which the monofunctional acrylate component was solely 2-ethyl hexyl acrylate has a transition temperature 23° C., and the transition temperature of the films was observed to decrease (which means that the range of temperatures at which the composition exhibited homogeneous anchoring, i.e., the temperature range above the transition temperature, increased) with an increasing mass fraction of isobornyl acrylate. This test established that isobornyl acrylate gives rise to a homogenous anchoring condition at least down to 5° C., which was the lowest observed anchoring transition temperature in the three films.

After the anchoring condition associated with particular monofunctional acrylates is determined, an appropriate mixture of monofunctional acrylates for the composition of the present invention is determined. The following mixing rules are provided as one method to determine the appropriate amount of each monofunctional acrylate in the monofunctional acrylate mixture. An example of one incremental way to form a PDLC composition is to select a desired transition temperature for the composition. The selection of the transition temperature will depend upon the range of operating temperatures of the PDLC film. In certain applications, it is desirable for the PDLC composition to have a transition temperature within the operating range, since the anchoring strength of the composition is lower at the transition temperature. For example, if a film with a low $V_{90}$ at a particular temperature is desired, then the goal will be to prepare a composition that exhibits a transition at that temperature. However, a PDLC composition in which the transition temperature is outside the operating temperature is also contemplated as useful because the switching voltage of PDLC films are often observed to be unusually insensitive to temperature changes over a wide temperature range above the anchoring transition temperature. Therefore, the PDLC compositions of the present invention allow one to design for temperature insensitivity over a chosen temperature range more readily than by using the one-monofunctional acrylate compositions.

The selected monofunctional acrylate that has been determined to provide a homeotropic anchoring condition in a PDLC film operating at the desired temperature is combined with the selected monofunctional acrylate that has been determined to provide a homogeneous anchoring condition in a PDLC film operating at that same temperature. Whether a monofunctional acrylate will give rise to a homogeneous anchoring condition or a homeotropic anchoring condition in a particular temperature range can be determined in the above-described manner.

After the particular monofunctional acrylates have been identified, the amount of each monofunctional acrylate in the composition that will give the desired effect is determined. The amount of each monofunctional acrylate monomer in the composition is determined in an iterative manner. That is, a composition is prepared and the transition temperature of a film made from the composition is observed. If the observed transition temperature is not the desired transition temperature, the composition is adjusted by adding more of one monofunctional acrylate monomer and commensurately less of the other. As a starting point, it is assumed that the transition temperature of a film made from the composition is linearly related to the relative amount of each monofunctional acrylate in the PDLC composition. That is, if a monofunctional acrylate designated as A is associated with a transition temperature $T_A$ and a monofunctional acrylate that is designated as B is associated with a transition temperature $T_B$, the transition temperature is approximated from the sum of $T_A$ times the mass fraction of A and $T_B$ times the mass fraction of B in the monofunctional acrylate blend. This is represented by the following equation:

$$T_{goal} = (T_A \cdot x) + (T_B \cdot (1-x))$$

wherein $T_{goal}$ is the desired transition temperature of the PDLC composition and x is the mass fraction of monofunctional acrylate A. Of course, this is only a starting point to determining the desired composition because in general the transition temperature is not linear with respect to composition. Once the composition is made and the transition temperature of the film formed from the composition is determined, the amounts of A and B in the composition may require further adjustment to obtain a composition with the desired transition temperature.

For example, if the first iteration used a composition parameter $x_1$ that provided a transition temperature $T_1$ that was unacceptably far from $T_{goal}$, that information is used to characterize the relationship between the anchoring transition temperature and the composition of the monofunctional acrylate blend (presuming that the anchoring transition temperature associated with each of the monofunctional acrylates in the composition is known). A quadratic fit of the data then provides an approximation of the composition that will provide the desired anchoring temperature using the following equations:

$$T_{goal} = T_A + (T_B - T_A)x + c \cdot x(1-x)$$

where $$c = [T_1 - T_A - (T_B - T_A) \cdot x_1]/[x_1(1-x_1)].$$

The above equations are then solved for x, which is the mass fraction of one of the monofunctional acrylate components in the mixture.

If the anchoring transition temperature that is associated with a single monofunctional acrylate-containing composition cannot be determined, a different iteration is proposed based upon the effect of the blend of monofunctional acrylates on the transition temperature of a PDLC film made from a composition containing that blend of monofunctional acrylates. In this example, a transition temperature is observed for the film and is associated with the mass fraction, x, of one of the monofunctional acrylates in the two-monofunctional acrylate blend. At least two data pairs of data points (i.e. at least two transition temperatures, each associated with a particular mass fraction) are required to make this iteration. A linear fit of the data is then done which can be used to approximate the mass fraction that will provide a film with the desired transition temperature ($T_{goal}$). Further iterations are performed using linear extrapolation of the data from the two compositions that exhibited an anchoring transition closest to $T_{goal}$ to obtain a composition that exhibits anchoring transition temperature even closer to $T_{goal}$.

Near the transition from homeotropic anchoring to homogeneous anchoring, the anchoring strength is expected to be weak. It is believed that it requires a lower electric field to switch films from "off" to "on" when the anchoring strength is low. Thus a PDLC composition in which the anchoring transition of the liquid crystal in the film occurs proximate (i.e. within about 10° C.) to the typical operating temperature of the PDLC is believed to be advantageous. Since PDLCs typically operate at room temperature (20° C. to about 30° C.) it is advantageous if the anchoring transition of the liquid crystal in these films occurs just below this temperature range. Having the anchoring transition below the operating temperature range is advantageous over having the anchoring transition above the operating temperature range. This is because the temperature dependence of the switching voltage is often observed to be weak over a temperature range (typically 20–30° C.) above the anchoring transition. The weak temperature dependence is desirable because it reduces the amount of temperature compensation required to operate the device. It is believed that the weak temperature dependence arises from two competing trends: 1.) with increasing temperature (above the transition) the anchoring strength increases; and 2.) the ratio of the nematoelastic constants to the dielectric anisotropy decreases. The first causes an increase in switching voltage and the latter a decrease in the switching voltage.

As stated previously, the PDLC composition of the present invention, when formed into a film, has a demonstrably lower switching voltage than films formed from PDLC compositions that do not have a mixture of monofunctional acrylates, one that gives rise to homeotropic anchoring and one that gives rise to homogeneous anchoring. This is illustrated by the following example. Furthermore, films formed from PDLC compositions of the present invention demonstrate this reduced switching voltage over a wide temperature range. It is advantageous if the films demonstrate this reduced switching over a temperature range of about 10° C. to about 50° C.

EXAMPLE 4

A series of films with the following general liquid crystal composition described in Table 1 in Example 1 above were prepared. The monofunctional acrylate component of the composition was varied from film to film. In one composition, the monofunctional acrylate was 100% by weight 2-ethyl hexyl acrylate. In the other compositions, the 2-ethyl hexyl acrylate was combined with varying weight percents of n-octyl acrylate. Three compositions were prepared in which the amount of n-octyl acrylate was 2 wt %, 5 wt %, and 9 wt % of the monofunctional acrylate component, respectively.

PDLC films were prepared from these compositions as described in Example 1. The forward light transmittance through these films was measured while various voltages were applied to the films. The forward transmittance and the response time of the film were measured in the manner described in Example 1.

Figure 4:
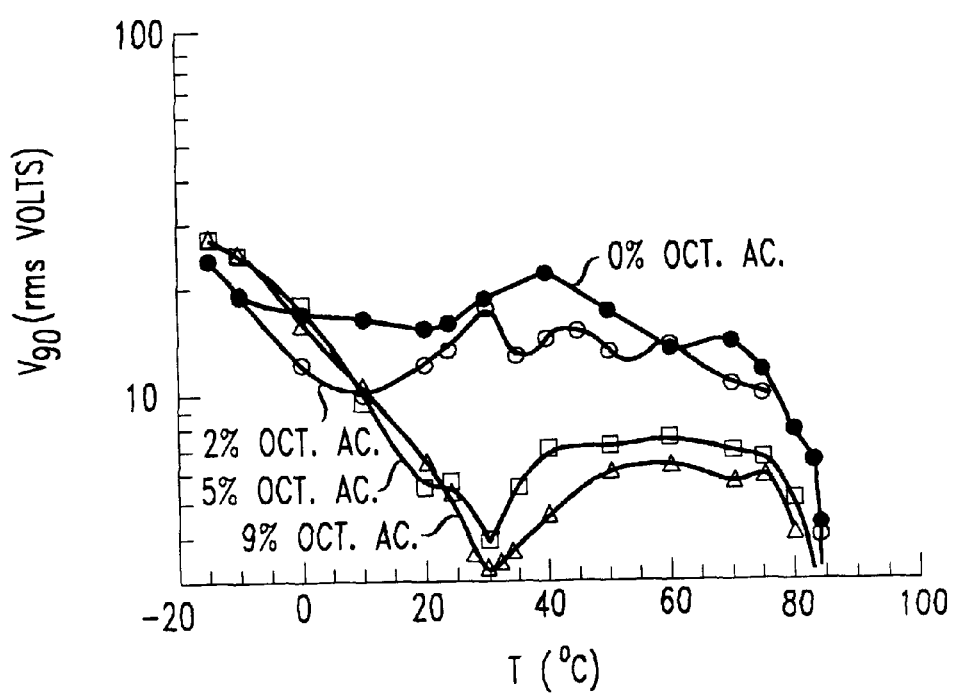
FIG. 4 is a graph of the switching voltages as a function of temperatures for PDLC films formed from the PDLC compositions with a varying amount of monofunctional straight chain alkyl acrylate therein.

FIG. 4 illustrates the switching voltage of PDLC films of these compositions as a function of temperature. As observed from FIG. 4, the switching voltage of the films formed from PDLC compositions in which the monofunctional acrylate component was 2 wt %, 5 wt % and 9 wt % n-octyl acrylate is significantly lower in the temperature range of 10° C. to 80° C. than the two films formed from liquid crystal compositions that contained only 2-ethyl hexyl acrylate and no n-octyl acrylate.

Figure 5:
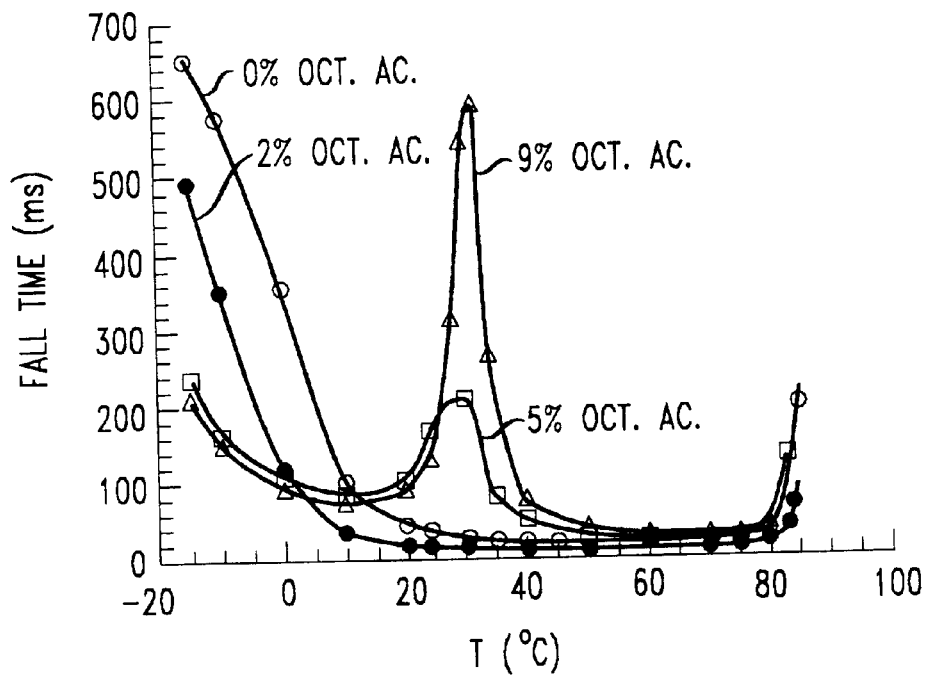
FIG. 5 is a graph of the fall time of a PDLC film as a function of temperature for PDLC films formed from the PDLC compositions with a varying amount of monofunctional straight chain alkyl acrylate therein.

FIG. 5 illustrates the fall time of the films as a function of temperature. FIG. 5 illustrates that the same two films that demonstrated a dramatically lower switching voltage in the 10° C. to 80° C. range also demonstrated an anchoring transition in this temperature range. The other films did not demonstrate a transition in this range. Although applicant does not wish to be held to a particular theory, applicant believes that PDLC films made from compositions that demonstrate a transition in the temperature range of 10° C. to 80° C. will also demonstrate a lower switching voltage in this range. Applicants attribute the presence of this transition to the mixture of monofunctional acrylates used in the liquid crystal composition. However, applicants also believe that compositions of the present invention will exhibit lower switching voltages without exhibiting this transition.

EXAMPLE 5

Three PDLC films were made from a composition that was 80 wt % TL205 liquid crystal and 20 wt % of a polymerizable mixture with the following general composition: monofunctional acrylate (85 wt %); trimethylol propane triacrylate (13.5 wt %); and a photoinitiator, Darocur 1173 (1.5 wt %). The monofunctional acrylate component was n-octyl acrylate in a first composition, isobornyl acrylate in a second composition, and a blend of isobornyl acrylate (68 wt %) and n-octyl acrylate (32 wt %) in a third composition. The amount of photoinitiator was increased to 2.1 wt % in the second composition (which resulted in a commensurate reduction wt % of the other components in the composition) to compensate for the lower reaction rate of the isobornyl acrylate. Films were made from each of the three compositions in the manner described in Example 1.

The anchoring transition temperature for the first composition (octyl acrylate only) was observed to be 77° C. with homeotropic anchoring below the transition temperature and homogenous anchoring above the anchoring transition temperature. The anchoring transition temperature was determined using electro-optic analysis. An anchoring transition was not observed for the film made from the second composition (isobornyl acrylate only). The anchoring transition temperature of the films were observed to decrease with increasing amounts of isobornyl acrylate in the composition.

Figure 6:
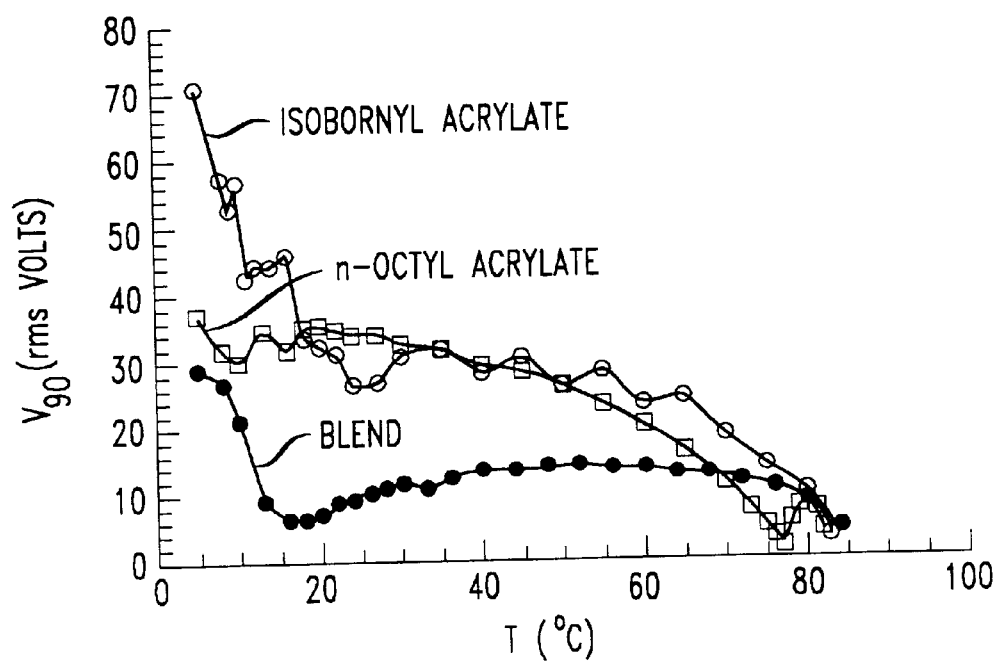
FIG. 6 is a graph of the switching voltage as a function of temperature for three PDLC films.

The switching voltages of these films as a function of temperature is illustrated in FIG. 6. The cusp of the switching voltage for the third composition (the blend of n-octyl acrylate and isobornyl acrylate) corresponds to an anchoring transition temperature of about 18° C., which is much lower than the transition temperature of a film formed from the first composition. This film also had a lower switching voltage than the films formed from the other compositions, especially over the temperature range of 12° C. to about 50° C.

We claim:

1. A polymer dispersed liquid crystal (PDLC) composition comprising:

about 50 weight percent to about 90 weight percent of a liquid crystal; and about 10 weight percent to about 50 weight percent of a polymerizable mixture of acrylate monomers, wherein the polymerizable acrylate monomer mixture comprises about 70 weight percent to about 95 weight percent of a mixture of at least two monofunctional acrylates, about 5 weight percent to about 25 weight percent of a polyfunctional acrylate, and about 0.01 weight percent to about 5 weight percent of a photoinitiator, wherein the composition is formed into a PDLC film and wherein one monofunctional acrylate gives rise to a homeotropic anchoring of the liquid crystal at an operating temperature of the PDLC film and a second monofunctional acrylate gives rise to a homogeneous anchoring of the liquid crystal at the operating temperature of the PDLC film.

2. The liquid crystal composition of claim 1 wherein the monofunctional acrylates are not identical and are selected from the group consisting of alkyl acrylates, cycloalkyl acrylates, aryl acrylates, and alkylaryl acrylates.

3. The liquid crystal composition of claim 2 wherein the polyfunctional crylate is trimethylol propane triacrylate.

4. The liquid crystal composition of claim 3 wherein the photoinitiator is selected from the group consisting of benzoin-ether initiators, benzophenone-type initiators, and thioxanthone-type initiators.

5. The liquid crystal composition of claim 1 wherein the operating temperature is about 10° C. to about 30° C.

6. A method of making a polymer dispersed liquid crystal film comprising:

selecting an anchoring transition temperature for the polymer dispersed liquid crystal film;

selecting a first monofunctional acrylate monomer that gives rise to a homeotropic anchoring condition at an operating temperature for the polymer dispersed liquid crystal film and a second monofunctional acrylate monomer that gives rise to a homogeneous anchoring condition at the operating temperature;

preparing a mixture that is about 50 weight percent to about 90 weight percent of a liquid crystal and about 10 weight percent to about 50 weight percent of a polymerizable mixture of acrylate monomers, wherein the polymerizable acrylate monomer mixture comprises about 5 weight percent to about 25 weight percent of a polyfunctional acrylate, about 0.01 weight percent to about 5 weight percent of a photoinitiator and about 70 weight percent to about 95 weight percent of a mixture comprising the first and second monofunctional acrylate monomers wherein the relative amount of each monofunctional acrylate monomer is selected to provide a polymer dispersed liquid crystal that has the anchoring transition temperature; and forming a film from the composition.

7. The method of claim 6 wherein the monofunctional acrylates are not identical and are selected from the group consisting of alkyl acrylates, cycloalkyl acrylates, aryl acrylates, and alkylaryl acrylates.

8. The method of claim 7 wherein the polyfunctional acrylate is trimethylol propane triacrylate.

9. The method of claim 8 wherein the photoinitiator is selected from the group consisting of benzoin-ether initiators, benzophenone-type initiators, and thioxanthone-type initiators.

10. The method of claim 6 wherein the selected temperature is about 10° C. to about 30° C.

* * * * *